(12) United States Patent
Booth et al.

(10) Patent No.: US 11,541,819 B2
(45) Date of Patent: Jan. 3, 2023

(54) VEHICLE CENTER CONSOLE ASSEMBLY

(71) Applicant: Nissan North America, Inc., Franklin, TN (US)

(72) Inventors: Jessica Booth, Riverview, MI (US); Christian Dubrock, Goodrich, MI (US); Katie Andersen, Beverly Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 180 days.

(21) Appl. No.: 17/035,498

(22) Filed: Sep. 28, 2020

(65) Prior Publication Data
US 2022/0097613 A1    Mar. 31, 2022

(51) Int. Cl.
*B60R 7/04* (2006.01)
*E05B 83/32* (2014.01)
*E05B 85/10* (2014.01)
*B60N 3/10* (2006.01)

(52) U.S. Cl.
CPC ................ *B60R 7/04* (2013.01); *B60N 3/10* (2013.01); *E05B 83/32* (2013.01); *E05B 85/10* (2013.01); *E05Y 2201/22* (2013.01); *E05Y 2201/474* (2013.01); *E05Y 2201/638* (2013.01); *E05Y 2600/528* (2013.01); *E05Y 2900/538* (2013.01)

(58) Field of Classification Search
CPC .. B60R 7/04; B60N 3/10; E05B 83/32; E05B 85/10; E05Y 2201/22; E05Y 2201/638; E05Y 2600/528; E05Y 2900/538
USPC .......................... 296/24.34, 37.8, 37.1, 24.46
See application file for complete search history.

(56) References Cited

U.S. PATENT DOCUMENTS

| | | | | |
|---|---|---|---|---|
| 5,106,143 A * | 4/1992 | Soeters | ..................... | B60N 2/75 292/303 |
| 6,367,857 B2 * | 4/2002 | Kifer | ...................... | B60N 2/793 296/37.8 |
| 6,572,169 B2 * | 6/2003 | Panhelleux | ............... | B60R 7/04 296/37.8 |
| 6,644,705 B2 * | 11/2003 | Wikman | ................... | B60R 7/04 296/37.8 |
| 7,258,381 B2 * | 8/2007 | Sturt | ......................... | B60R 7/04 296/37.7 |
| 7,429,068 B2 * | 9/2008 | Busha | ........................ | B60R 7/04 296/37.7 |
| 7,591,498 B2 * | 9/2009 | Busha | ..................... | B60N 3/101 224/281 |

(Continued)

*Primary Examiner* — D Glenn Dayoan
*Assistant Examiner* — E Turner Hicks
(74) *Attorney, Agent, or Firm* — Global IP Counselors, LLP

(57) ABSTRACT

A vehicle center console assembly includes a vehicle body structure and a center console assembly. The vehicle body structure includes a passenger compartment floor with a front seat assembly installed to the floor and a pair of second row seats installed to the floor rearward of the front seat assembly. The center console assembly is releasably attached to the floor between the pair of second row seats. The center console has a manually operated latch mechanism operable between a locked orientation in which the center console is fixedly attached to the floor in an installed orientation and a release orientation in which the center console is released from attachment to the floor and is movable away from the installed orientation and out of the vehicle.

14 Claims, 10 Drawing Sheets

(56) References Cited

U.S. PATENT DOCUMENTS

| | | | | |
|---|---|---|---|---|
| 8,888,147 B2 * | 11/2014 | Blanck | ...................... | B60R 7/04 292/37 |
| 9,975,493 B2 * | 5/2018 | Okinaga | ................... | B60R 7/08 |
| 2002/0140246 A1 * | 10/2002 | Worrell | ................... | B60N 2/26 296/37.8 |
| 2007/0046058 A1 * | 3/2007 | Busha | ...................... | B60R 7/04 296/37.8 |
| 2008/0079278 A1 | 4/2008 | Rajappa et al. | | |

* cited by examiner

VEHICLE CENTER CONSOLE ASSEMBLY

BACKGROUND

Field of the Invention

The present invention generally relates to vehicle center console assembly. More specifically, the present invention relates to vehicle center console assembly that is removably installed to a passenger compartment floor between rear seats and rearward of a front center console, and, is removable from the vehicle without tools.

Background Information

Many vehicles include a center console between front seats of the vehicle.

SUMMARY

One object of the present disclosure is to provide a vehicle with a rear center console assembly that is removably installed to a passenger compartment floor between rear seats rearward of a front center console, where the rear center console is removable from the vehicle without the need for tools.

Another object of the present disclosure is to provide a vehicle with a rear center console that can be removed manually by a passenger or vehicle operator in the absence of tools.

In view of the state of the known technology, one aspect of the present disclosure is to provide a vehicle center console assembly with a vehicle body structure and a center console assembly. The vehicle body structure includes a passenger compartment floor with a front seat assembly installed to the floor and a pair of second row seats installed to the floor rearward of the front seat assembly. The center console releasably is attached to the floor between the pair of second row seats. The center console has a manually operated latch mechanism operable between a locked orientation in which the center console is fixedly attached to the floor in an installed orientation and a release orientation in which the center console is released from attachment to the floor and is movable away from the installed orientation and out of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
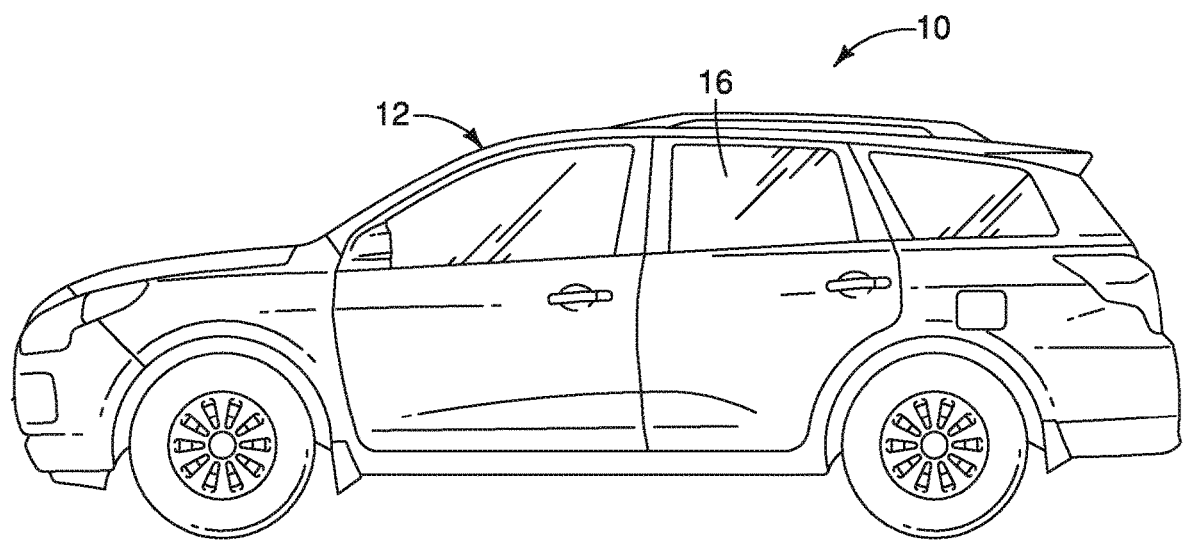
FIG. 1 is a side view of a vehicle that has a passenger compartment with a front and a rear center console assembly in accordance with an exemplary embodiment.
Figure 2:
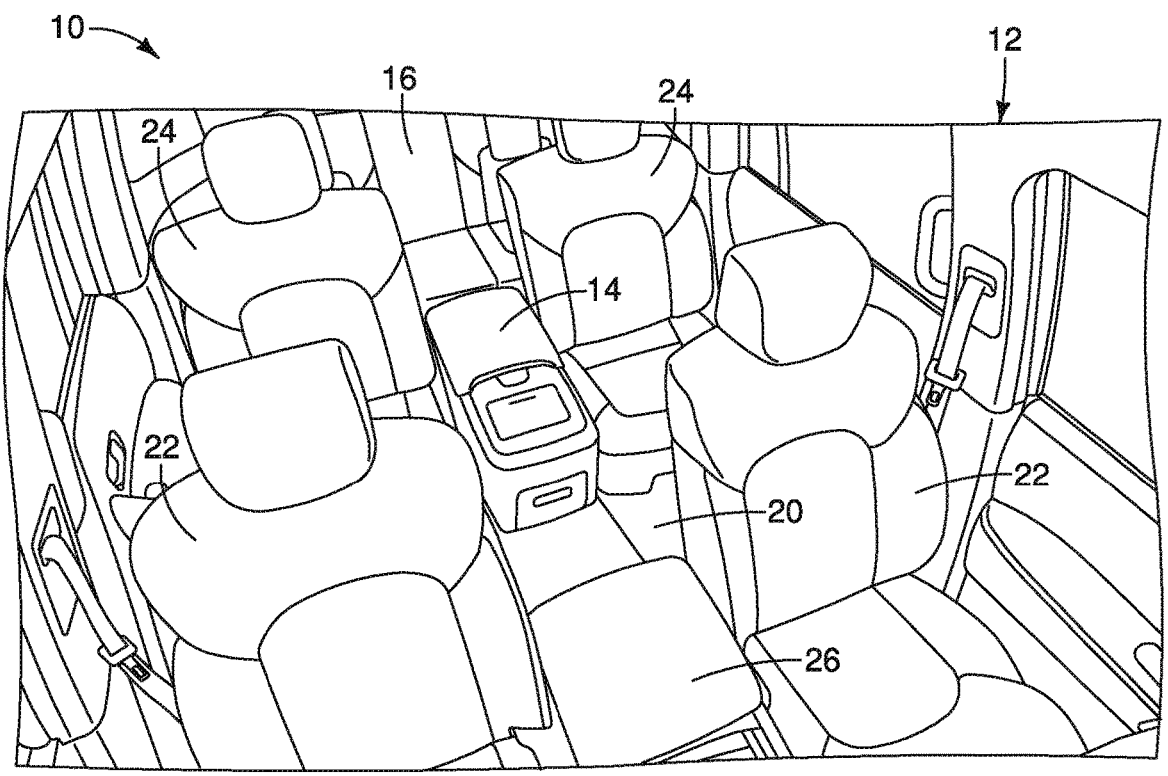
FIG. 2 is a perspective view of the passenger compartment of the vehicle depicted in FIG. 1 showing a front center console assembly and a rear center console assembly in accordance with the exemplary embodiment.

Referring initially to FIGS. 1 and 2, a vehicle 10 that includes a vehicle body structure 12 with a center console assembly 14 is illustrated in accordance with a first embodiment. The vehicle body structure 12 defines a passenger compartment 16.

The vehicle 10 is depicted as an SUV (sports utility vehicle) but can alternatively be any of a variety of vehicles, such as a pick-up truck with rear seats, a sedan with rear seats or other vehicle configuration that includes both front and rear seat arrangements.

Figure 3:
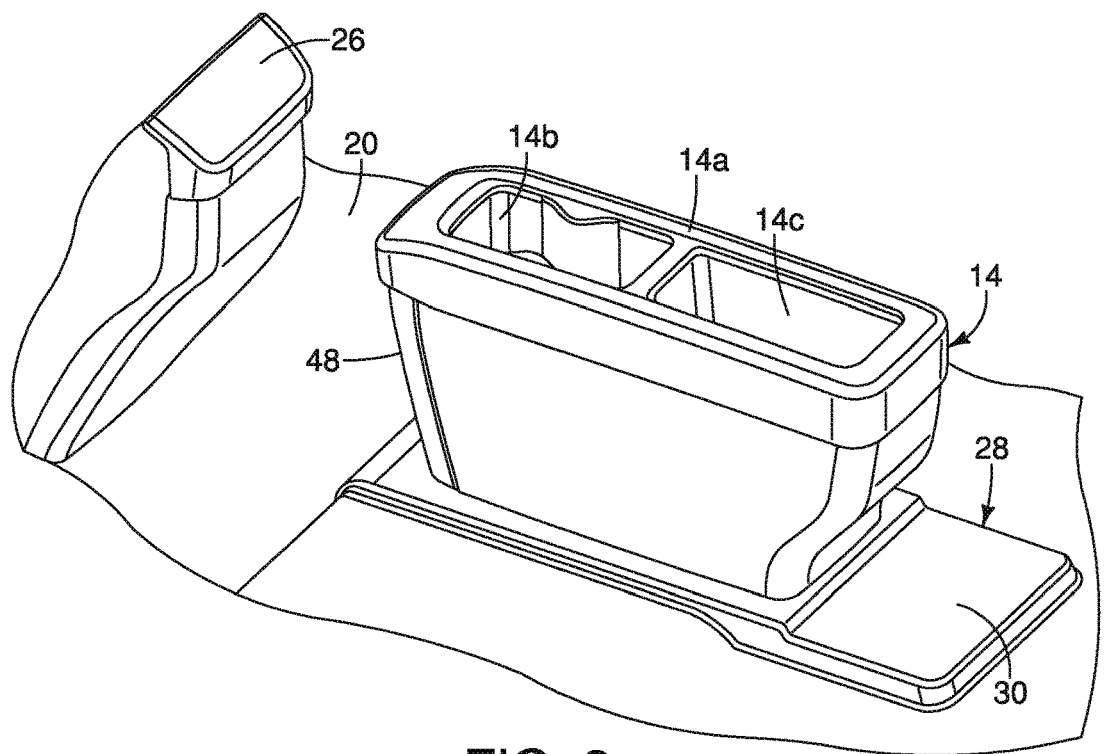
FIG. 3 is a perspective view of the floor of the passenger compartment showing a portion of the front center console assembly and the rear center console assembly in accordance with the exemplary embodiment.

As shown in FIG. 2, the vehicle body structure 12 includes a floor 20, a pair of front seats 22, a pair of rear seats 24, a front center console 26 and the center console assembly 14 (also referred to hereinbelow as a rear center console 14). The floor 20 defines a lower boundary of the passenger compartment 16 in a conventional manner. As shown in FIG. 3, the floor 20 includes a center console support portion 28 that supports the center console assembly 14, as described in greater detail below.

The pair of front seats 22 (also referred to as a front seat assembly 22) and the pair of rear seats 24 are bucket seats dimensioned and shaped such that each one of the front seats 22 and rear seats 24 seat only one person, in a conventional manner. The front center console 26 is fixedly attached to the floor 20 in a conventional manner. Since the seats 22 and 24 and the front center console 26 are all conventional features, further description is omitted for the sake of brevity.

Figure 4:
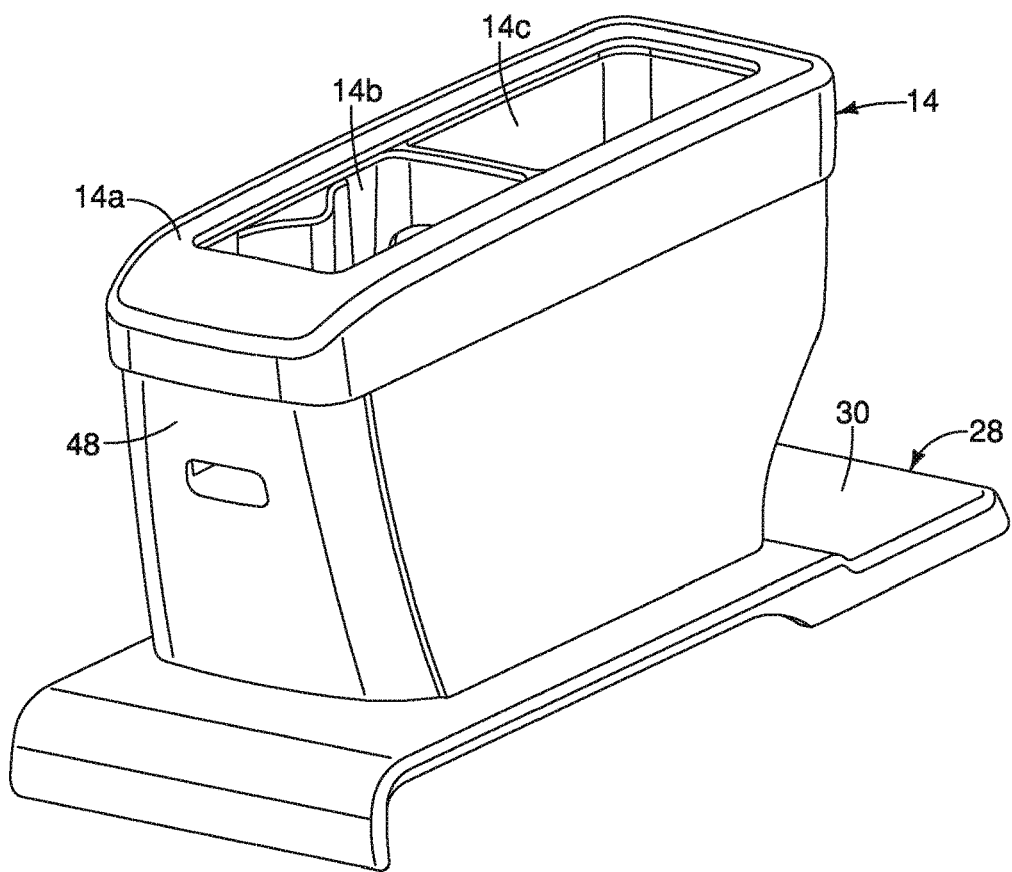
FIG. 4 is another perspective view of the floor of the passenger compartment showing the rear center console assembly and a removable panel thereof in accordance with the exemplary embodiment.

The center console assembly 14 (the rear center console assembly 14) is a removable structure that is located within the passenger compartment 16 rearward of the front center console 26 (as shown in FIGS. 2 and 3) and between the pair of rear sates 24 (as shown in FIG. 2). As shown in FIGS. 3 and 4, the center console 14 has an upper surface 14a that can include, for example, a cupholder section 14b and a storage compartment 14c.

Figure 7:
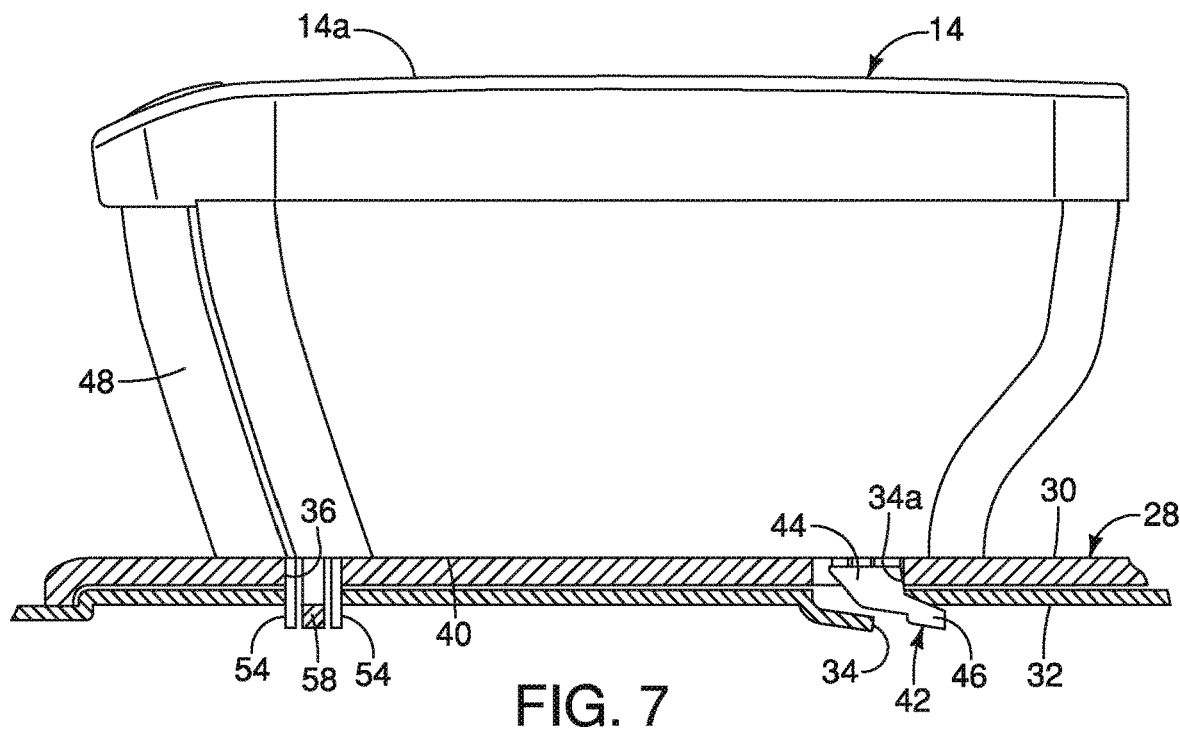
FIG. 7 is a side cross-sectional view showing a latch mechanism and one of the hooks that extend downward from the bottom surface of the rear center console assembly releasably securing the rear center console assembly to the floor in accordance with the exemplary embodiment.
Figure 8:
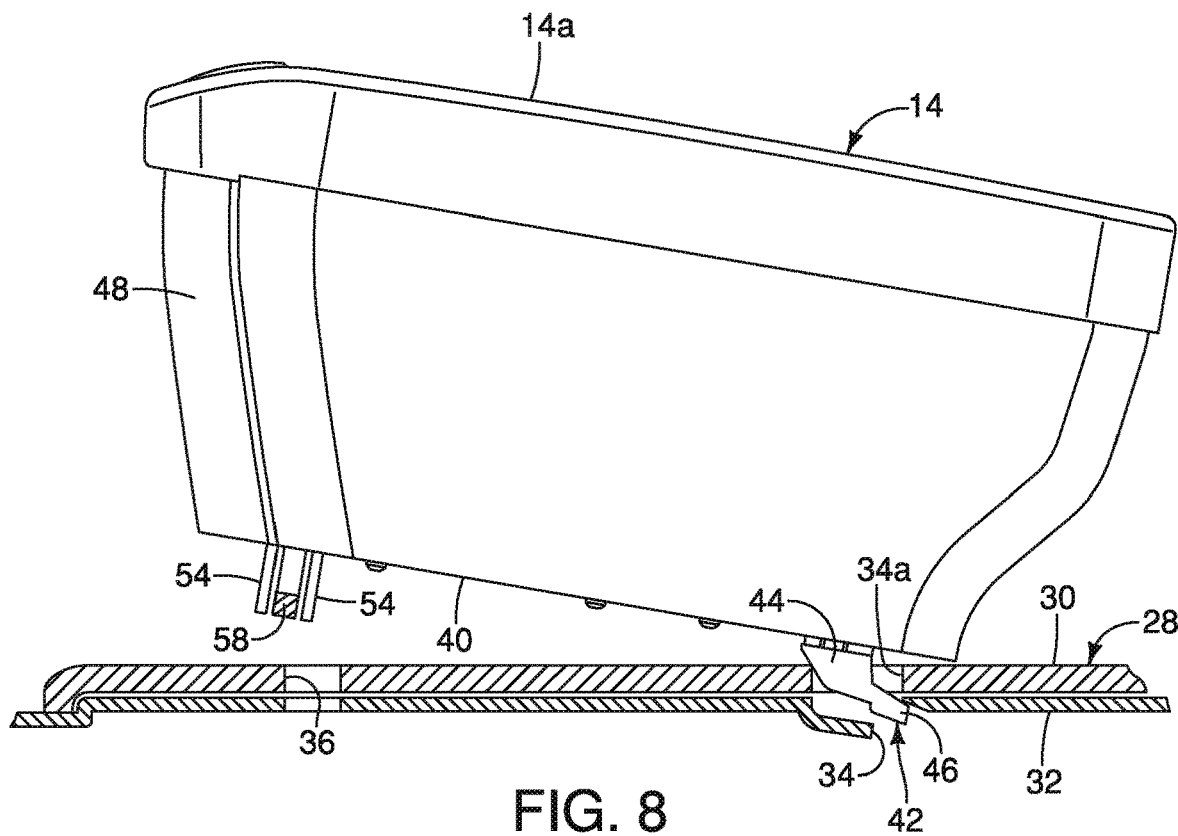
FIG. 8 is another side cross-sectional view similar to FIG. 7 showing the latch mechanism released from the floor with a forward portion of the rear center console assembly lifted upward partially removing the rear center console assembly from the floor with the hooks sill engaged with the floor in an intermediate step of removing the rear center console assembly from the floor in accordance with the exemplary embodiment.
Figure 9:
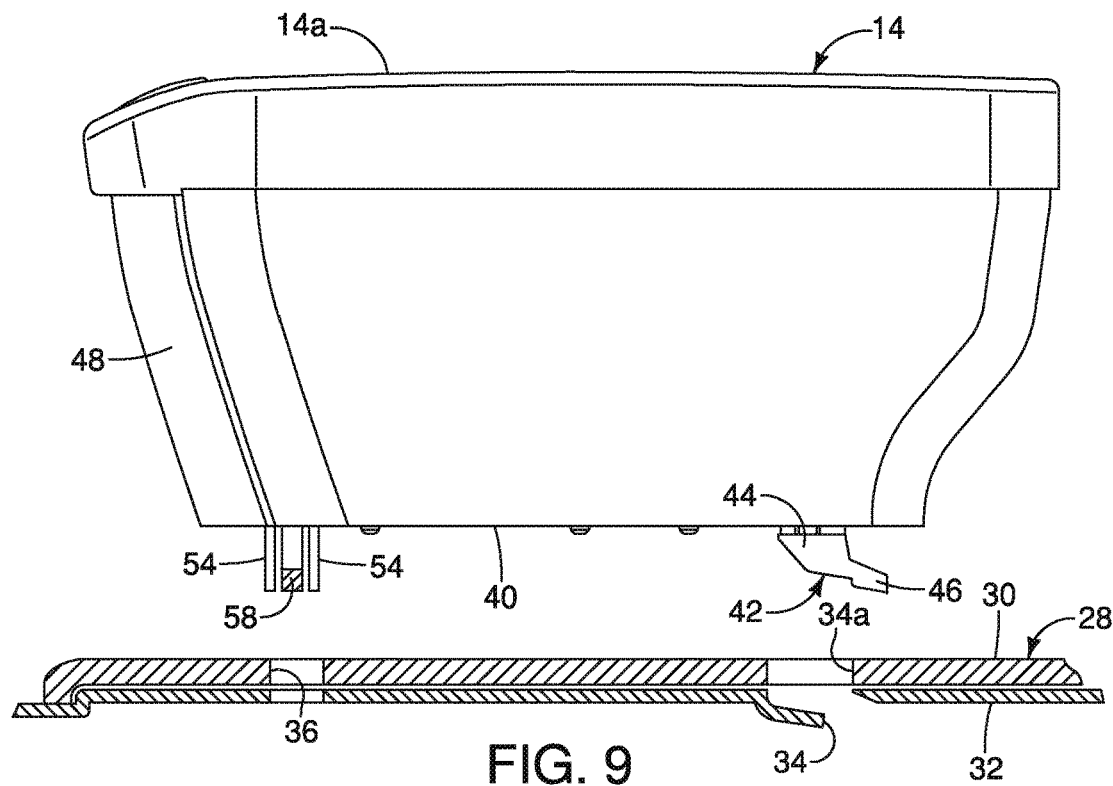
FIG. 9 is yet another side cross-sectional view similar to FIGS. 7 and 8 showing the hooks withdrawn from the floor completely removing the rear center console assembly from the floor without the use of tools in accordance with the exemplary embodiment.

As shown in FIGS. 7-9, the center console assembly 14 is configured such that it is easily manually removeable and manually installable to the floor 20, as described in greater detail below. More specifically, the center console assembly 14 is movable between an installed orientation (FIGS. 2-5 and 7) and an uninstalled orientation (FIG. 9).

Figure 5:
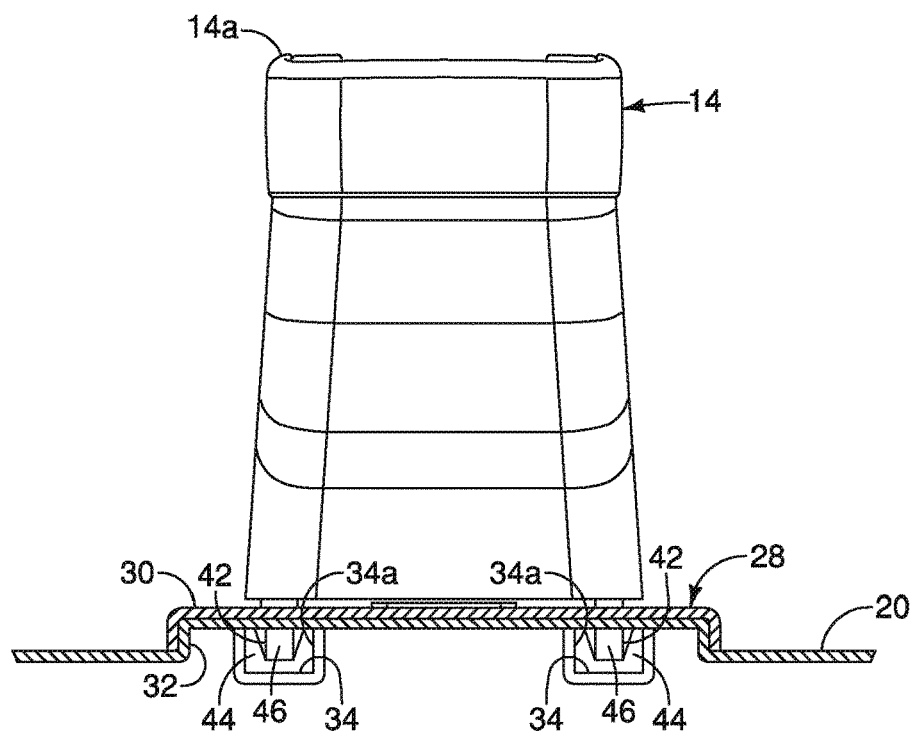
FIG. 5 is a view of the rear center console assembly with a portion of the floor rearward of the rear center console assembly in cross-section showing an upper fascia portion and a metallic support portion of a center console support portion of the floor with a pair of hooks extending downward from a bottom surface of the rear center console assembly removably retaining the rear center console assembly to the floor in accordance with the exemplary embodiment.
Figure 6:
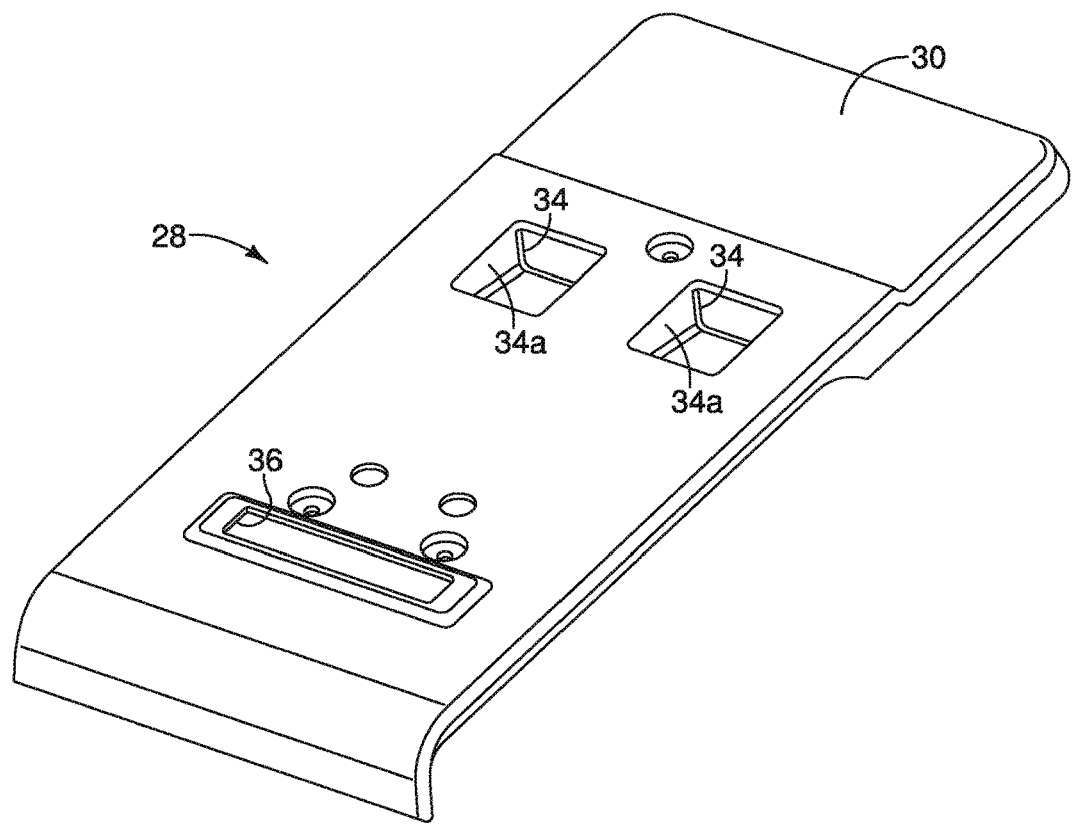
FIG. 6 is a perspective view of the center console support portion of the floor showing hook receiving openings and a latch receiving opening in accordance with the exemplary embodiment.

As shown in FIG. 5—The floor 20 (also referred to herein below as the passenger compartment floor 20) includes a center console support portion 28 located between the pair of rear seats 24 (also referred to as second row seats 24). As shown in FIGS. 5 and 7, the center console support portion 28 includes an upper fascia portion 30 and a metallic support portion 32. The upper fascia portion 30 overlays the metallic support portion 32. The metallic support portion 32 can be a section of the floor 20, or, can be a separate metallic layer that is separate from and overlays the floor 20. Further, if the metallic support portion 32 is a separate layer overlaying the floor 20, then the metal support portion 32 is rigidly fixed to the floor 20 by, for example, mechanical fasteners (not shown) or welding techniques (not shown). The upper fascia portion 30 and the metallic support portion 32 also define a pair of hook receiving openings 34. Both the upper fascia portion 30 and the metallic support portion 32 include the hook receiving openings 34 such that the openings 34 in the upper fascia portion 30 are aligned with the openings 34 in the metallic support portion 32.

As shown in FIGS. 6-9, both the upper fascia portion 30 and the metallic support portion 32 of the center console support portion 28 further define a latch receiving opening 36.

As shown in FIGS. 5-9 and 11, a bottom surface 40 of the center console assembly 14 includes a pair of hooks 42 that are laterally spaced apart from one another and are located adjacent to laterally opposite sides of the center console assembly 14. The pair of hooks 42 are space apart from one another by a distance that corresponds to a distance between the hook receiving openings 34. In other words, the hooks 42 are located and dimensions to fit into the hook receiving openings 34 as shown in FIGS. 7-9. Specifically, FIGS. 7-9 show process for removing the center console assembly 14 without any tools, as described in further detail below.

The hooks 42 include a base section 44 and a hook end 46. The base sections 44 of the hooks 42 are dimensioned to fit into recessed areas 34a of the hook receiving openings 34 of the center console support portion 28. The hook end 46 extends parallel to the bottom surface 40 of the center console assembly 14 and extends past the recessed area 34a and through the hook receiving opening 34. The base section 44 are dimensioned to snuggly fit into the recessed areas 34a, thereby assisting in limiting and/or preventing small movements of the center console assembly 14 when in the installed orientation shown in FIG. 7.

The center console assembly 14 also includes a removable panel 48 (FIG. 4) and a latch mechanism 50 that is installed within the center console assembly 14. The latch mechanism 50 includes a housing 52 (FIGS. 14-18), alignment projections 54 (FIGS. 7-9, 11-12 and 16-17), a cam plate 56 (FIGS. 13-14, and 17-19), and latch members 58 (FIGS. 7-9 and 15-19).

Figure 10:
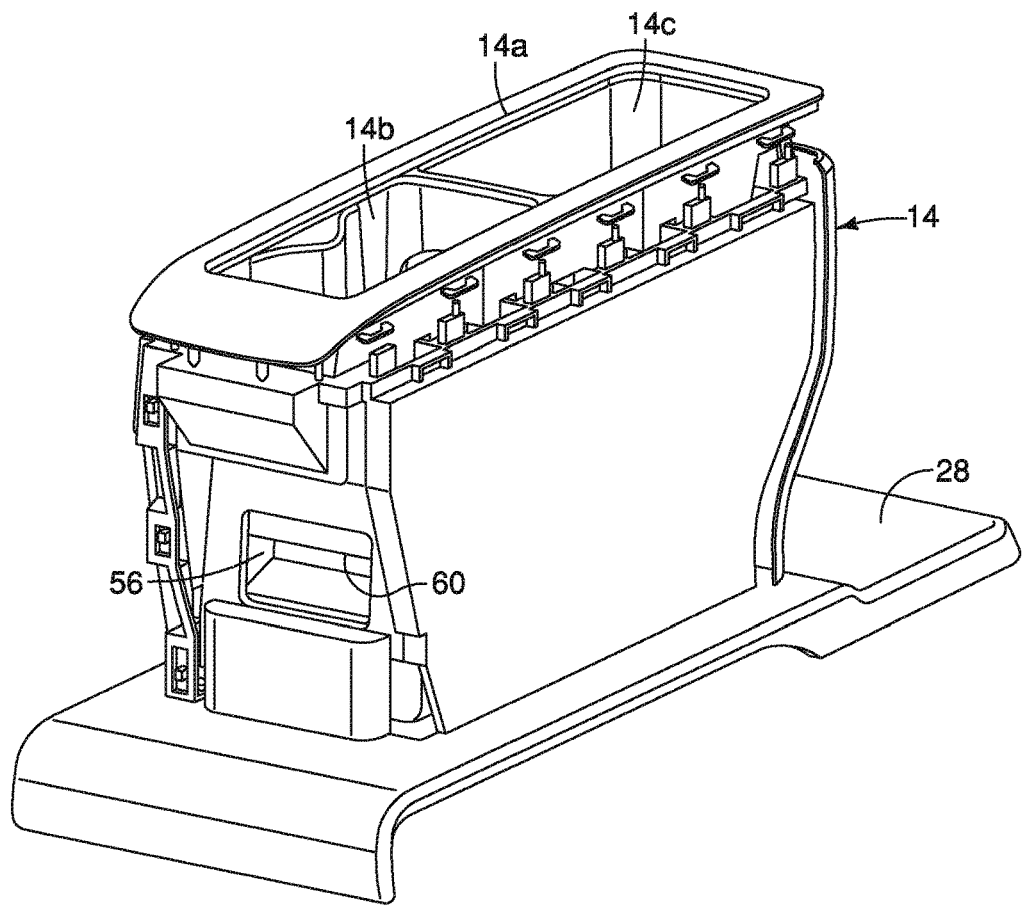
FIG. 10 is a perspective view of the rear center console assembly installed to the floor, with a removable front panel removed from the rear center console assembly exposing a latch mechanism handle of a latch mechanism in an initial step for removing the rear center console assembly from the floor in accordance with the exemplary embodiment.
Figure 11:
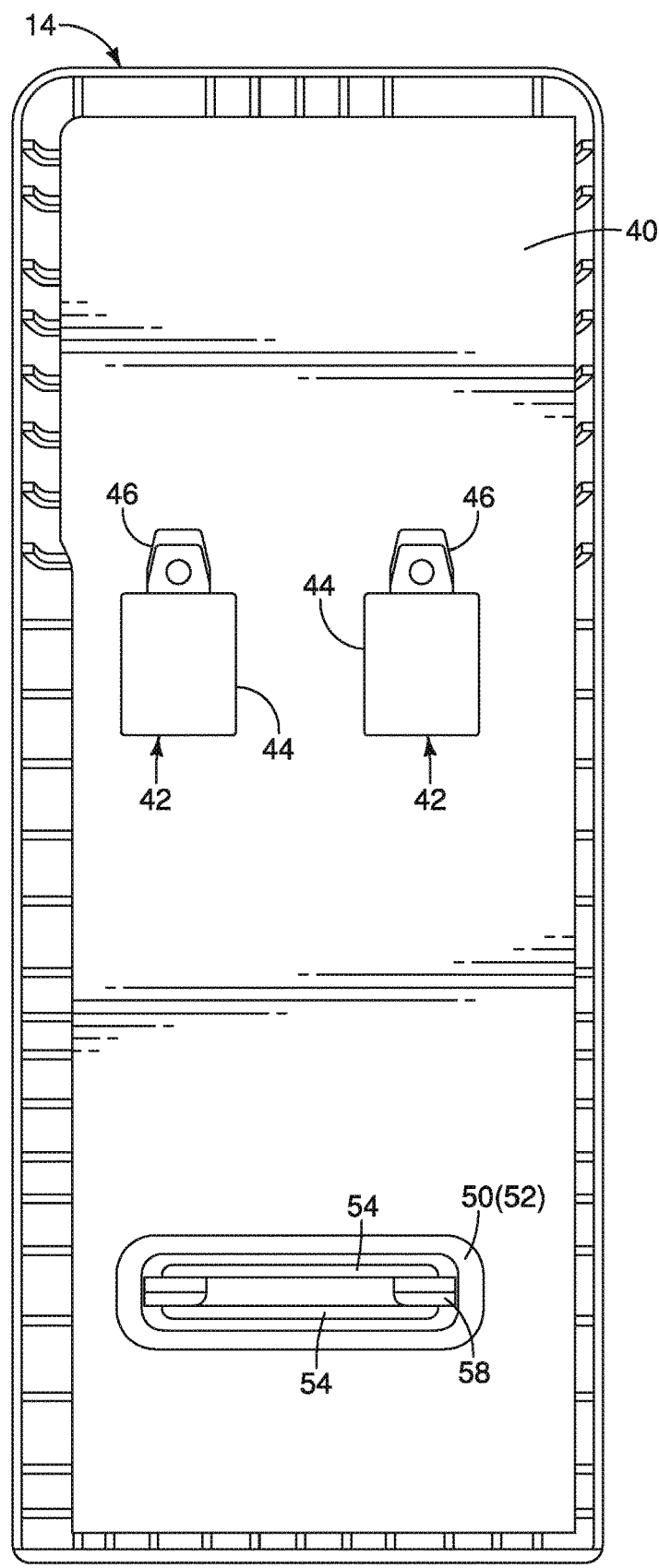
FIG. 11 is a bottom view of the rear center console assembly showing the hook receiving openings and the latch receiving opening in accordance with the exemplary embodiment.
Figure 12:
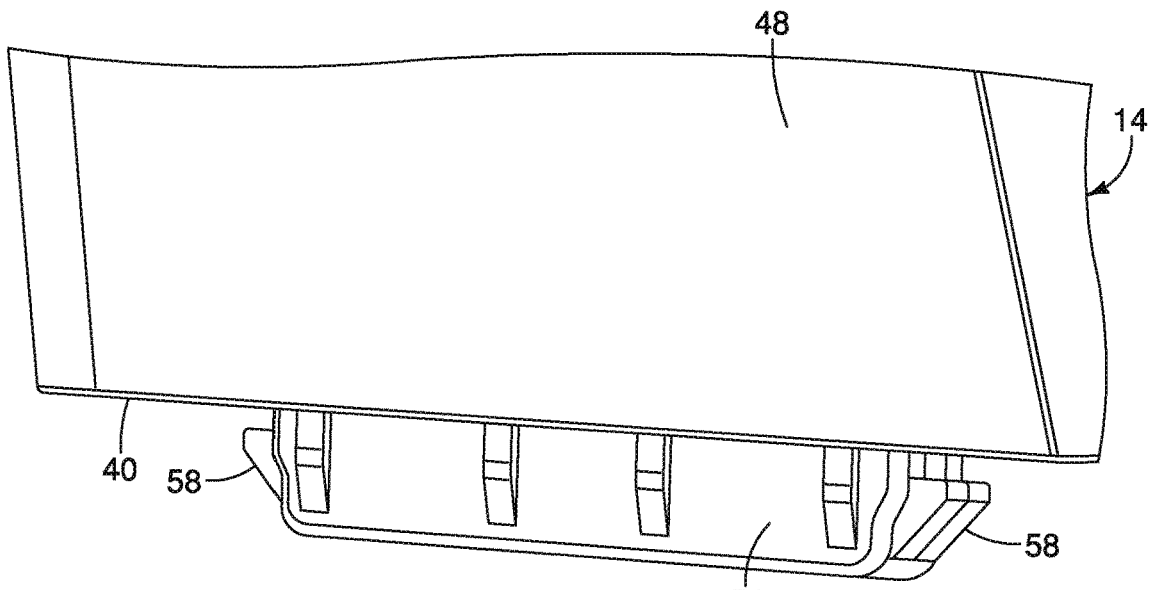
FIG. 12 is a perspective view of a lower area of a front portion of the rear center console assembly with the rear center console assembly removed from the floor showing latch members of the latch mechanism in accordance with the exemplary embodiment.
Figure 13:
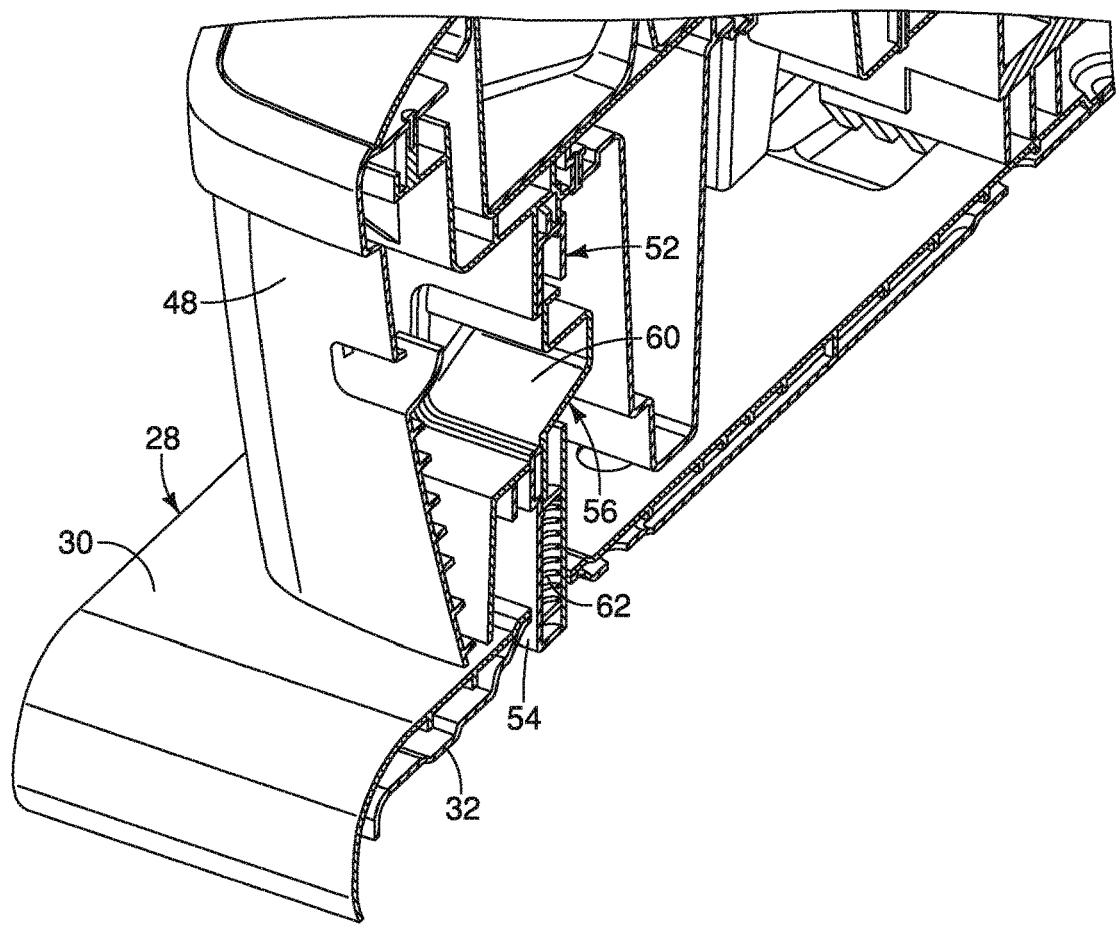
FIG. 13 is a perspective cross-sectional view of the rear center console assembly showing a portion of the latch mechanism and floor in accordance with the exemplary embodiment.
Figure 14:
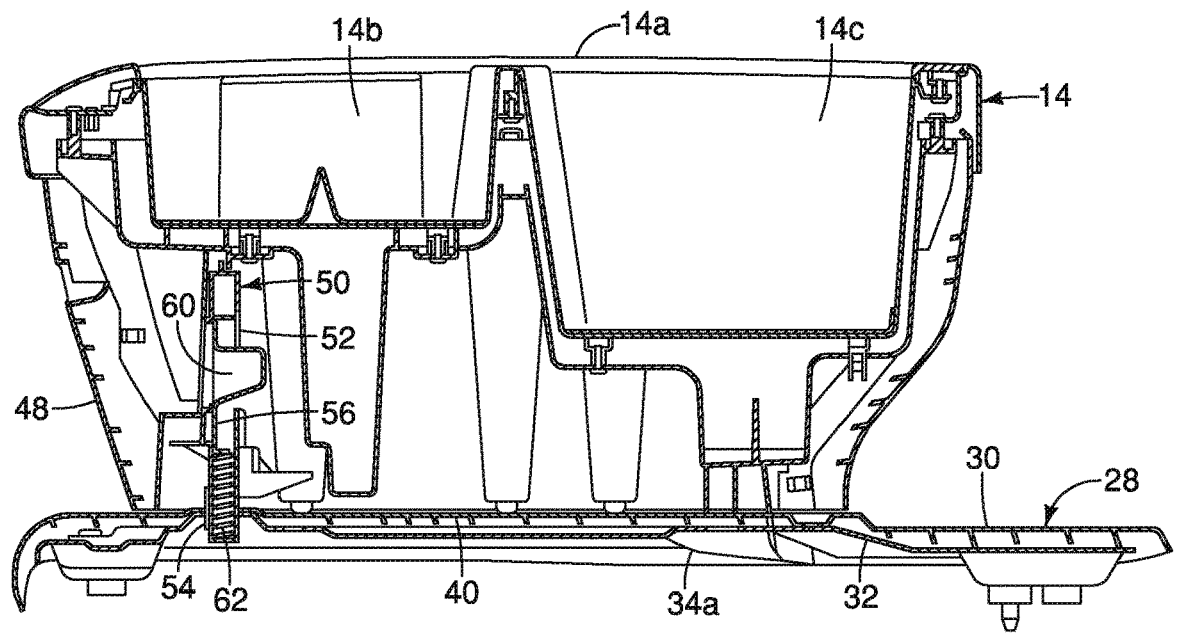
FIG. 14 is a side cross-sectional view of the rear center console assembly showing the portion of the latch mechanism and floor in accordance with the exemplary embodiment.
Figure 15:
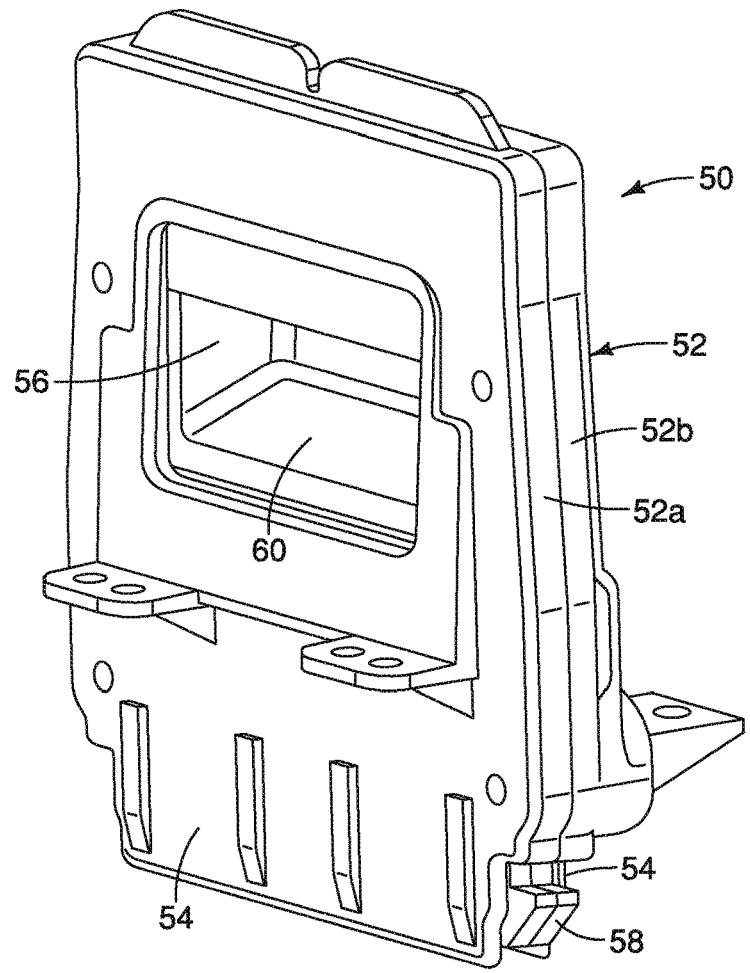
FIG. 15 is a first perspective view of the latch mechanism removed from the rear center console in accordance with the exemplary embodiment.
Figure 16:
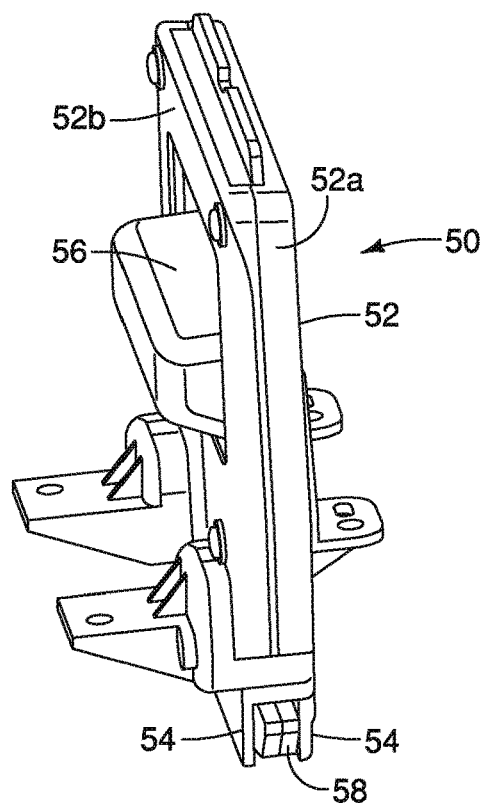
FIG. 16 is a second perspective view of the latch mechanism removed from the rear center console in accordance with the exemplary embodiment.

As shown in FIG. 4, the removable panel 48 covers a forward section of the center console assembly 14. As shown in FIG. 10, with the removable panel 48 manually removed (along with a side panel) by a passenger or vehicle operator, a handle 60 of the cam plate 56 of the latch mechanism is exposed. When the passenger or vehicle operator lifts the handle 60 of the can plate 56 upward, the can plate 56 causes the latch members 58 to move from a locked position shown in solid lines in FIG. 19 to a release position shown in phantom lines in FIG. 19. With the latch member 58 in the release position, the center console assembly 14 can be lifted upward and removed from the floor 20, as described in greater detail below.

Figure 17:
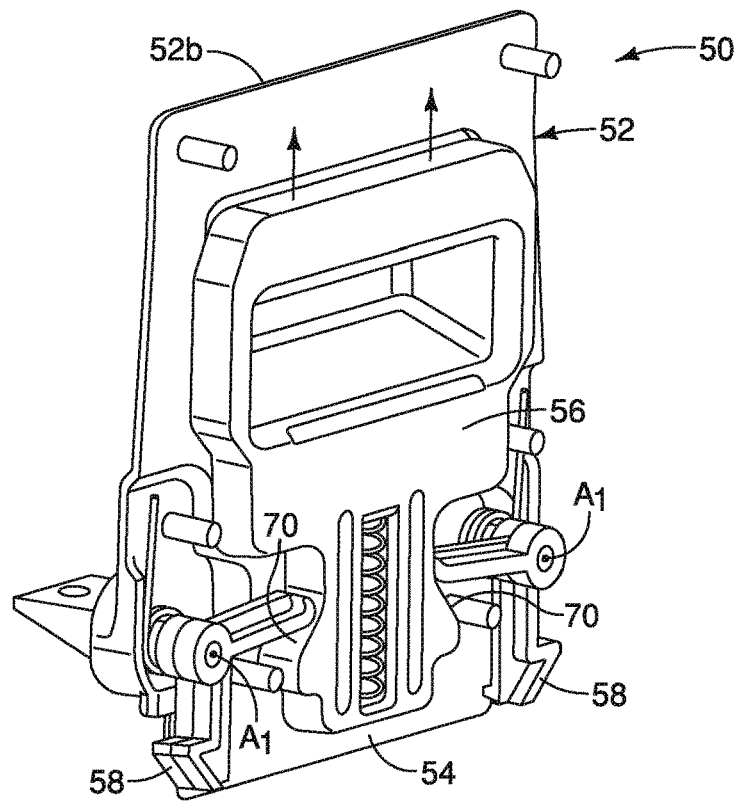
FIG. 17 is a third perspective view of the latch mechanism with a portion of the housing of the rear center console removed showing a cam plate and the latch members in accordance with the exemplary embodiment.
Figure 18:
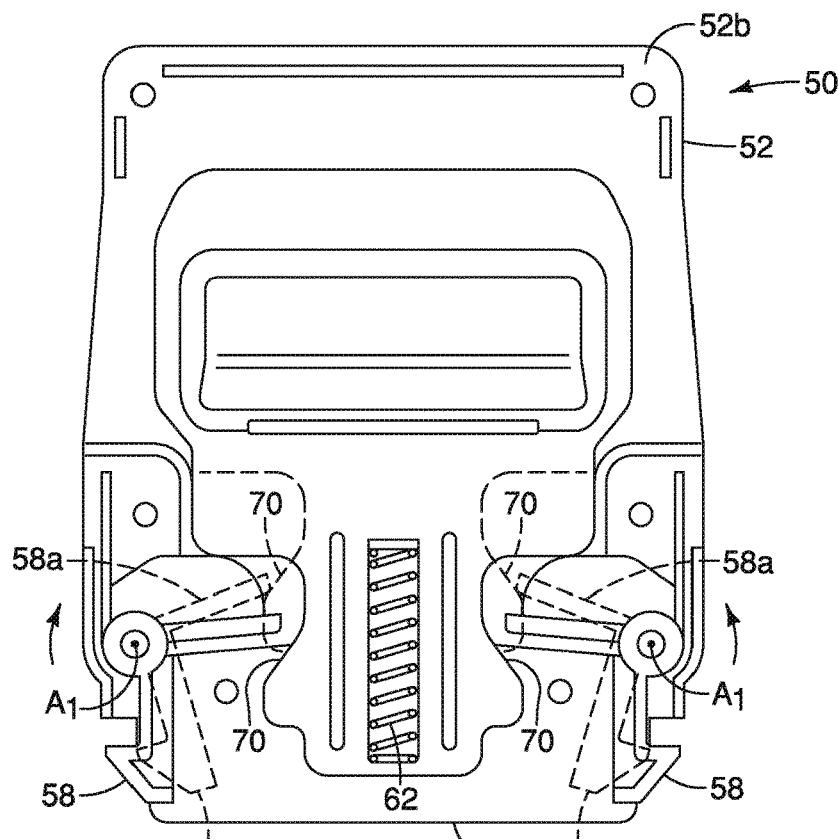
FIG. 18 is a front plan view of the latch mechanism with the portion of the housing of the rear center console removed showing the cam plate and the latch members in a locked orientation (solid lines) and a release orientation (phantom lines) in accordance with the exemplary embodiment.
Figure 19:
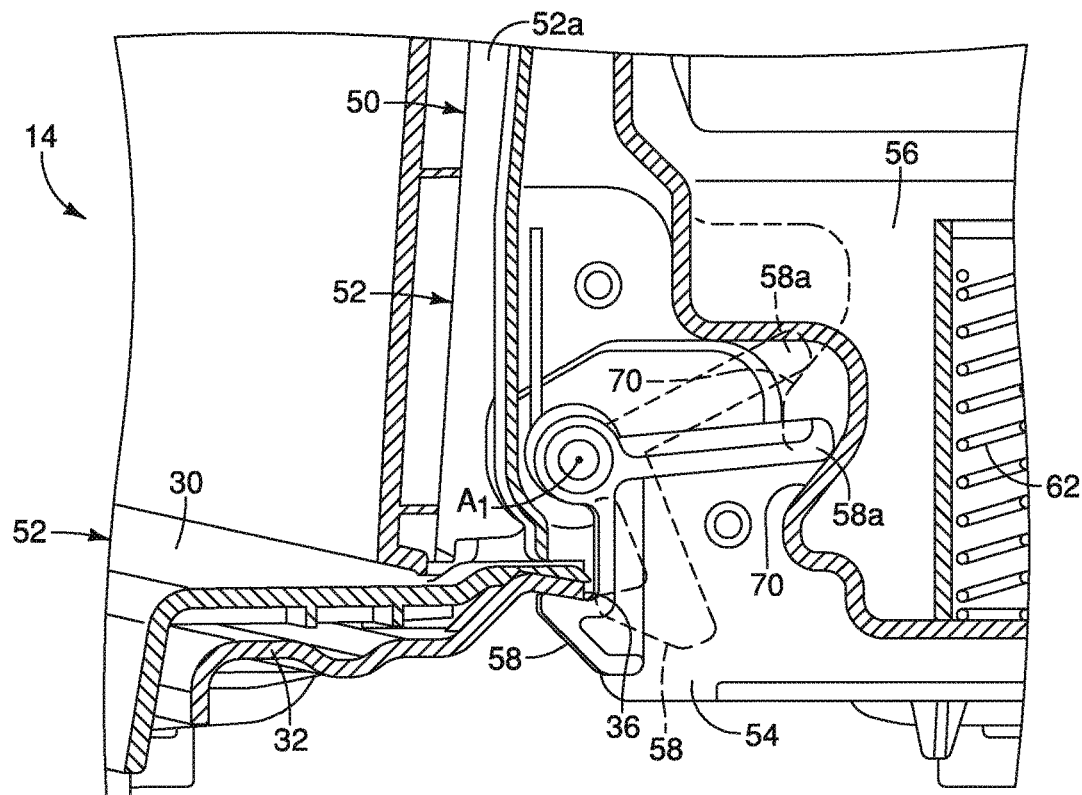
FIG. 19 is a front perspective view of one side of the latch mechanism with the portion of the housing of the rear center console removed showing the cam plate and one of the latch members in a locked orientation (solid lines) and a release orientation (phantom lines) in accordance with the exemplary embodiment.

The housing 52 of the latch mechanism 50 also includes a forward part 52a and a rearward part 52b. As shown in FIGS. 17-19 with the forward part 52a removed, the cam plate 56 is fully shown. The cam plate 56 includes the handle 60, a biasing spring 62, a spring receiving portion 64, cam surfaces 70 and posts that define pivot axes $A_1$. Further, each of the latch members 58 is shown with a lever portion 58a. Each latch member 58 and corresponding lever portion 58a are unitarily formed as a single element. The latch member 58 and lever portion 58a can he made of a strong polymer or plastic material, or can be made of a metallic material.

The cam surfaces 70 are shaped and positioned such that when the cam plate 56 is lifted by the handle 60, the cam surfaces 70 contact the lever portion 58a, causing the latch members 58 and corresponding lever portions 58a to pivot about the corresponding axis $A_1$ thereby moving the latch members 58 from the locked orientation (solid lines in FIGS. 17-19) to the released orientation (phantom lines in FIGS. 18 and 19).

As shown in FIG. 7, initially, the center console assembly 14 is attached to the center console support portion 28 of the floor 20. The center console assembly 14 is held in place at a rearward portion thereof by the engagement of the hooks 42 with the hook receiving openings 34 of the center console support portion 28, and, the latch mechanism 50 being in the locked orientation.

The center console assembly 14 can be a manually removed from the center console support portion 28 of the floor 20, as follows. As shown in FIG. 10, the removable panel 48 is removed to reveal the handle 60 of the can plate 56. The passenger or vehicle operator can lift the can plate 56 via the handle thereby operating the latch mechanism 50 to move the latch members 58 from their locked orientation to the release orientation, thereby unlocking the forward end of the center console assembly 14. As shown by comparing FIG. 7 and FIG. 8, the forward end of the center console assembly 14 can be lifted up. As shown in FIG. 9, the shape and configuration of the hooks 42 and the hook receiving openings 34 are such that the center console assembly 14 can be lifted away from the floor 20, such that the center console assembly 14 is completely released from attachment to the floor 20. Thereafter, the center console assembly 14 can be moved away from the installed orientation and, if desired, completely removed from the vehicle 10.

The center console assembly 14 can thereafter be re-installed to the floor 20 by first inserting the hooks 42 into the hook receiving openings 34, and thereafter, the latch members 58 and the alignment projection 54 are inserted into the latch receiving opening 36.

The alignment projections 54 are dimensioned to fit snuggly into the latch receiving opening 36 to assist in properly aligning the center console assembly 14 in position. The alignment projections 54 along with the latch members 58 can further provide secure and non-movable engagement between the center console assembly 14 and the floor 20. As mentioned above, the hooks 42 are similarly dimensioned to reduce and or eliminate any movement between the center console assembly 14 and the floor 20.

When the handle 60 is released by the passenger or vehicle operator, the cam plate 56 is moved downward via the biasing force of the spring 62. Further, biasing springs (not shown) operably located between the posts that define the pivot axes $A_1$ and the latch members 58, urge the latch members 58 to the locked orientation.

The various features of the vehicle (other than the rear center console 14) are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical". "horizontal", "below" and "transverse" as well as any other similar directional terms refer to those directions of a vehicle equipped with the vehicle center console assembly. Accordingly, these terms, as utilized to describe the present invention should be interpreted relative to a vehicle equipped with the vehicle center console assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them, The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle center console assembly, comprising
    a vehicle body structure that includes a passenger compartment floor with a front seat assembly installed to the floor and a pair of second row seats installed to the floor rearward of the front seat assembly, the floor including at least one hook receiving opening; and
    a center console releasably attached to the floor between the pair of second row seats, the center console having a manually operated latch mechanism operable between a locked orientation in which the center console is fixedly attached to the floor in an installed orientation and a release orientation in which the center console is released from attachment to the floor and is movable away from the installed orientation and out of the vehicle, a bottom surface of the center console including at least one hook dimensioned to manually insert into the at least one hook receiving opening and be manually removed from the at least one hook receiving opening.

2. The vehicle center console assembly according to claim 1, wherein
    the floor further includes a latch receiving opening, and the latch mechanism includes a pair of latch members positioned to manually insert into the latch receiving opening and be manually withdrawn from the latch receiving opening.

3. The vehicle center console assembly according to claim 2, wherein
the pair of latch members of the latch mechanism are configured such that in the locked orientation the pair of latch members are spring biased to locations where the pair of latch members are a first distance from one another, and in the release orientation the pair of latch members are moved to locations where the pair of latch members are a second distance from one another, the first distance being greater than the second distance.

4. The vehicle center console assembly according to claim 2, wherein
the latch mechanism includes a handle member that is movable between the locked orientation and the release orientation such that in response to the handle member being moved to the release orientation, a portion of the handle member contacts the pair of latch members moving them closer to one another.

5. A vehicle center console assembly, comprising
a vehicle body structure that includes a passenger compartment floor with a front seat assembly installed to the floor and a pair of second row seats installed to the floor rearward of the front seat assembly; and
a center console releasably attached to the floor between the pair of second row seats, the center console having a manually operated latch mechanism operable between a locked orientation in which the center console is fixedly attached to the floor in an installed orientation and a release orientation in which the center console is released from attachment to the floor and is movable away from the installed orientation and out of the vehicle,
the floor of the passenger compartment includes a center console support portion that includes an upper fascia portion that overlays a metallic support portion, the upper fascia portion and the metallic portion defining aligned hook receiving openings and aligned latch receiving openings.

6. The vehicle center console assembly according to claim 5, wherein
the latch mechanism includes a pair of latch members positioned to manually insert into the aligned latch receiving openings and be manually withdrawn from the aligned latch receiving openings.

7. The vehicle center console assembly according to claim 6, wherein
the latch mechanism includes a handle member with a pair of cam surfaces configured to contact corresponding ones of the pair of latch members in response to movement from the installed orientation to the release orientation.

8. The vehicle center console assembly according to claim 7, wherein
the pair of latch members are supported within the latch mechanism for pivoting movement about respective pivot shafts.

9. The vehicle center console assembly according to claim 1, wherein
the latch mechanism includes a handle member and a pair of latch members, the handle member includes a pair of cam surfaces configured to contact corresponding ones of the pair of latch members in response to movement from the installed orientation to the release orientation.

10. The vehicle center console assembly according to claim 9, wherein
the floor further includes a latch receiving opening, and
in response to the pair of latch members of the latch mechanism being moved to the release position the pair of latch members are manually inserted into the latch receiving opening and in response to the pair of latch members being moved to the installed orientation are not removable from the latch receiving opening.

11. The vehicle center console assembly according to claim 10, wherein
the at least one hook is further dimensioned to manually insert into the at least one hook receiving opening with the pair of latch members in the release orientation.

12. The vehicle center console assembly according to claim 1, wherein
the center console includes a removable panel such that with the removable panel installed to the center console, the removable panel covers and conceals the latch mechanism, and, with the removable panel removed from the center console the latch mechanism is exposed.

13. The vehicle center console assembly according to claim 1, wherein
the center console includes an upper surface that defines at least one cup holder.

14. The vehicle center console assembly according to claim 1, wherein
the center console includes an upper surface that includes a storage compartment.

\* \* \* \* \*